United States Patent

Elting et al.

[11] Patent Number: 5,960,940
[45] Date of Patent: Oct. 5, 1999

[54] SELF-ADJUSTING ELECTRIC TAPPET SWITCH

[75] Inventors: Ralf Elting, Radolfzell; Wolfgang Huber, Deisenhausen; Reinhard Lange, Gaienhofen-Horn, all of Germany

[73] Assignee: TRW Fahrzeugelektrik GmbH & Co. KG, Germany

[21] Appl. No.: 08/961,821

[22] Filed: Oct. 31, 1997

[30] Foreign Application Priority Data

Oct. 31, 1996 [DE] Germany ............... 196 45 059

[51] Int. Cl.$^6$ ............... H01H 3/16; H01H 9/02; H01H 13/20
[52] U.S. Cl. ............... 200/296; 200/16 B; 200/341
[58] Field of Search ............... 200/61.88–61.91, 200/341–345, 520–536, 16 B, 16 E, 16 A

[56] References Cited

U.S. PATENT DOCUMENTS

| | | | |
|---|---|---|---|
| 4,316,065 | 2/1982 | Rupp et al. | 200/61.89 |
| 5,154,282 | 10/1992 | Pascal | 200/345 |
| 5,389,756 | 2/1995 | Micallef | 200/345 |
| 5,512,717 | 4/1996 | Magome et al. | 200/295 |
| 5,826,709 | 10/1998 | Jacob | 200/345 |

FOREIGN PATENT DOCUMENTS

| | | |
|---|---|---|
| 2 441 258 | 6/1980 | France . |
| 2 532 105 | 2/1984 | France . |
| 0 349 367 A1 | 1/1990 | France . |
| 42 15 515 C1 | 8/1993 | Germany . |
| 2 282 005 | 3/1995 | United Kingdom . |

OTHER PUBLICATIONS

EP 97 11 7798 European Search Report.

*Primary Examiner*—J. R. Scott
*Attorney, Agent, or Firm*—Fay, Sharpe, Beall, Fagan, Minnich & McKee, LLP

[57] ABSTRACT

A self-adjusting electric tappet switch includes a housing, an electrical switch contact carried on the housing, a slider member movable relative to the housing and adapted to actuate the electrical switch, and an elongate tappet member extending from the housing and selectively engageable with the slider member. The slider member has a first engagement portion adapted to selectively connect with a second engagement portion provided on the elongate tappet member. The switch is self-adjusted by relative rotational movement between the slider member and the elongate tappet member to lock the pair together. In an installation and adjustment position of the tappet and slider system, the slider member is held in a predetermined fixed switching position in the housing relative to the electrical switch while relative longitudinal slidable movement between the tappet member and the slider member is enabled for adjusting the tappet relative to the slider member and switch housing without affecting the position of the slider member within the housing. After the desired length of the tappet member is selected, the slider and tappet members are locked together at the first and second engagement areas. Afterwards, displacement of the tappet member within the housing causes a corresponding movement of the slider member carried on the tappet member relative to the electrical switch.

19 Claims, 3 Drawing Sheets

SELF-ADJUSTING ELECTRIC TAPPET SWITCH

BACKGROUND OF THE INVENTION

The subject invention is directed toward the art of self-adjusting electric tappet switches and, more particularly, to self-adjusting automotive brake light tappet switches of the type generally including a displaceable tappet member carrying a slider guided within a housing member for activating one or several electrical contacts contained within the housing to actuate an automotive brake light.

The invention is especially well suited for incorporation into automotive brake light circuits and will be described with reference to that application; however, as will become apparent, the invention is capable of broader application and could be incorporated in a variety of components or used as a separate self-adjusting electric tappet switch for many purposes.

Self-adjusting electric tappet switches are typically used in automotive brake light switch applications because they provide simple equalization of tolerances between the back side of brake pedal linkages and the vehicle metal bodies holding the brake light switch housings in place in openings provided for accepting and fastening the switch housings to the vehicle.

One such known self-adjusting electric tappet switch produced by the assignee of this application includes a tappet member provided with a plurality of circumferential first stop elements. The first stop elements cooperate with a plurality of corresponding second stop elements provided on a slider member comprising the known self-adjusting electric tappet switch. The slider member is slidably received in the switch housing and the tappet member is held in the slider member by cooperation of the first and second plurality of stop elements. During installation of this switch into the metal automotive vehicle bodies, the switch housing is inserted from a face surface of the surrounding metal as viewed relative to the brake pedal, and into an acceptance opening provided in the metal body. The head of the elongate tappet member extending from the switch body is thereby pressed against the upper side of the brake pedal member. In the above-described adjustment and mounting position, the elongate tappet member is engaged with the slider member in the housing with the tappet member extending from the switch housing to its fullest extent.

At this stage, if the head of the tappet member is moved in the direction of the upper side of the switch housing because of abutment against the upper side of the brake pedal, then the tappet and slider system is first moved into the switch housing until a specified switch position is reached. This switch position is preferably defined by a slider stop located in the housing. The tappet of the switch is designed with a minimum length so that the switching position will be achieved during installation of the switch in the acceptance opening of the metallic vehicle body member. However, if the distance between the holding metal and the upper side of the brake pedal is smaller than the required displacement path of the tappet and slider system for attaining the above switching position, then additional pressure is exerted upon the tappet member during installation of the switch housing into the acceptance opening through abutment of the head of the tappet member against the upper side of the brake pedal. As a result of this additional pressure, the threshold value force is surpassed for the arresting displacement of the tappet relative to the slider and automatic adjustment of the tappet takes place.

After complete installation of the switch into the acceptance opening in the position in which the upper side of the switch housing abuts against the underside of the holding metal, the tappet switch is fixated in the acceptance opening by rotation of the switch body or housing through a predetermined specified angle. To that end, the switch housing described above includes one or more projections which project during installation of the switch into the acceptance opening and corresponding encoding recesses. The several projections grab behind the metal vehicle body after rotation of the switch housing through the above-mentioned predetermined angle around the longitudinal axis of the switch.

One disadvantage, however, with respect to switches of the general type described above is that under certain circumstances there may be unintentional displacement of the specified stop position between the tappet member and the slider member. This can be caused, for example, due to heat expansion of switch components or due to wear of the stop areas. Manipulation of the brake pedal height or body panel or other support structure in the area of the switch after completion of the switch self-adjustment steps, can also lead to unintentional misadjustment of the desired stop position. This results in an undesirable displacement of the switching point to a point beyond the original setting so that the brake light of the vehicle is not switched on until a given position of the brake pedal is reached, in which significant brake effect may have already been attained. Prior to this electric switching point, other vehicles on the road following a vehicle experiencing the above-noted switch disturbance, receive no indication at all with respect to the braking process previously commenced.

German Patent Application 196 03 135.4 assigned to the assignee of the instant application describes a self-adjusting and lockable tappet switch which solves some of the above-noted problems. With this switch, the tappet and slider member system can be changed from an adjustment position to a locked position through mere rotation of the tappet member around its longitudinal axis. In the locked position, movement of the tappet member relative to the slider member is not possible.

One disadvantage, however, of switches of the general type described above is that during the adjustment process, initially the slider and tappet members must be brought into a defined position relative to each other before displacement takes place of the tappet member relative to the slider member for the adjustment itself to be effected. This requires a relatively long displacement path during installation of the switch and, furthermore, as a result of mechanical tolerances, worn locking means, or the like, displacement of the tappet member relative to the slider member may have previously occurred without the tappet member being in the specified switching position. As a consequence, the desired switching point may not be reached under certain circumstances. In that case, the automotive brake light switch mechanism is ineffective to operate the vehicle braking light circuit.

SUMMARY OF THE INVENTION

The subject invention provides an improved self-adjusting tappet switch which practically eliminates, in a simple fashion, any defective installation and, which evidences a high degree of operating and installation safety while safely preventing any unintended maladjustments of the switch system.

In accordance with the invention, there is provided an improved self-adjusting tappet switch including a housing, an electric switch contact carried on the housing, an elongate tappet member adapted to engage a motor vehicle brake pedal and a slider member carried on the elongate tappet member and adapted to engage and activate the electrical switch contact based on movement of the tappet member relative to the housing. The slider member is movable within the housing between a first slider member position and a second slider member position. In the first position, the slider member is spaced apart from the electrical switch contact. In the second slider member position, the electrical switch contact is activated by the slider member to in turn close an operatively associated external motor vehicle brake light circuit. The elongate tappet member is selectively movable within the housing between a first installation and adjustment position and a second locked position. In the installation and adjustment position, the elongate tappet member is movable relative to the slider member to facilitate the mounting of the switch and adjustment of the tappet member between the motor vehicle body frame and the brake pedal. In the second locked position, an engagement portion of the tappet member mateably connects a corresponding portion of the slider member so that the slider member moves with the elongate tappet member in response to movement of the brake pedal on one end of the tappet member causing the electrical switch contact to close.

In accordance with a somewhat more limited aspect of the invention, the tappet member is rotationally movable within the housing between the first installation and adjustment position and the second locked position. Further, the tappet member is adapted for longitudinal slidable movement relative to the slider member when the tappet member is in the first installation and adjustment position.

As can be appreciated, a primary object of the present invention is the provision of a new and improved self-adjusting tappet switch which substantially eliminates, in a simple fashion, any defective installation of the switch in a motor vehicle while maintaining a high degree of operating and installation safety.

It is an advantage of the invention that the slider member is positioned in the desired switching position within the housing during installation and adjustment of the switch in a motor vehicle. Inasmuch as during the actual adjustment process, the slider need not be moved, greater installation and operating safety directly results. After the adjustment process, the tappet member and switch are joinable via the electric contact means, so that only then a displacement of the slider is possible and necessary in order to produce electric switching movements.

When employed as a motor vehicle brake light switch, the switching movement of the subject invention is produced through activation of the motor vehicle brake pedal. It is to be noted, however, that switches of this type are arranged adjacent brake pedal linkage which, upon activation of the brake pedal, move in a direction having a tendency to increase the distance between the switch and the respective upper or underside of the brake pedal. In other words, when the brake pedal is activated, the tappet member, together with the slider member, is moved in a direction out of the switch housing due to tensioning by a resilient spring element within the housing. It is an advantage of the present invention that the subject self-adjusting tappet switch is usable in the opposite orientation or direction where the tappet member and slider member are moved together into the switch housing for activation of the electric contacts therein.

Another advantage of the preferred embodiment of the invention is that the slider member is acted on by a resilient spring element and held in a predetermined switching position spaced apart from the electric contacts while the tappet and slider members are disposed in the mounting and adjustment position. To facilitate switch adjustment, the connection force between the tappet member and the slider member while in the mounting and adjustment position is matched to the triggering force of the resilient spring element in such a manner that displacement of the tappet member relative to the slider member takes place in the mounting and adjustment position without a deflection of the slider member from the predetermined switching position. For that purpose, the tappet and slider members are preferably designed in such a manner that in the mounted and adjustment position, the tappet and slider members are slidably displaceable in the housing.

Still yet another advantage of the present invention is that while in the mounting and adjustment position, the tappet member is acted upon by a second resilient spring element so that the tappet member may be moved against a stop element on the housing limiting the tappet member movement in a direction away from the housing.

One benefit of the present invention is that the switching position of the slider member is defined by a stop element disposed in the housing. The stop element is only effective for maintaining the switching position of the slider member while the slider and tappet members are in the mounting and adjustment position. After changing over the tappet and slider members into the locked position, the stop elements are simultaneously moved out of the way enabling the slider member to move in a direction toward the electric contacts in the housing for activating the electric contacts. The stop lug member is formed by a separator piece in a recess of an operatively associated installation part on the motor vehicle body. The tappet member is coaxially guidable through the stop lug and recess.

The slider member and separator piece preferably have projections and/or recesses which cooperate in a manner that in the adjustment and installation position, the slider member is held in the switching position and, in the locked position, the projections and/or recesses engage each other and release movement of the slider member from the switching position in order to activate or deactivate the electric contacts in the housing.

The above specific preferred embodiments of the invention have the overall advantage that the destruction of or damage to the switch can be prevented in a simple fashion because the housing is advantageously formed to accommodate gross movements of the tappet member into the housing due to faulty operation or unexpected use of the switch. In that regard, an adequate displacement path for tappet and slider member movement is provided for in the housing. A benefit of this construction is that additional stop lug members or similar tabs or stops or the like are not necessary for blocking movement of the tappet or slider members into the housing to prevent destruction thereof.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1b is an outline of an installation opening adapted for receiving the switch shown in FIG. 1a;

DETAILED DESCRIPTION OF THE PREFERRED EMBODIMENT

Figure 1A:
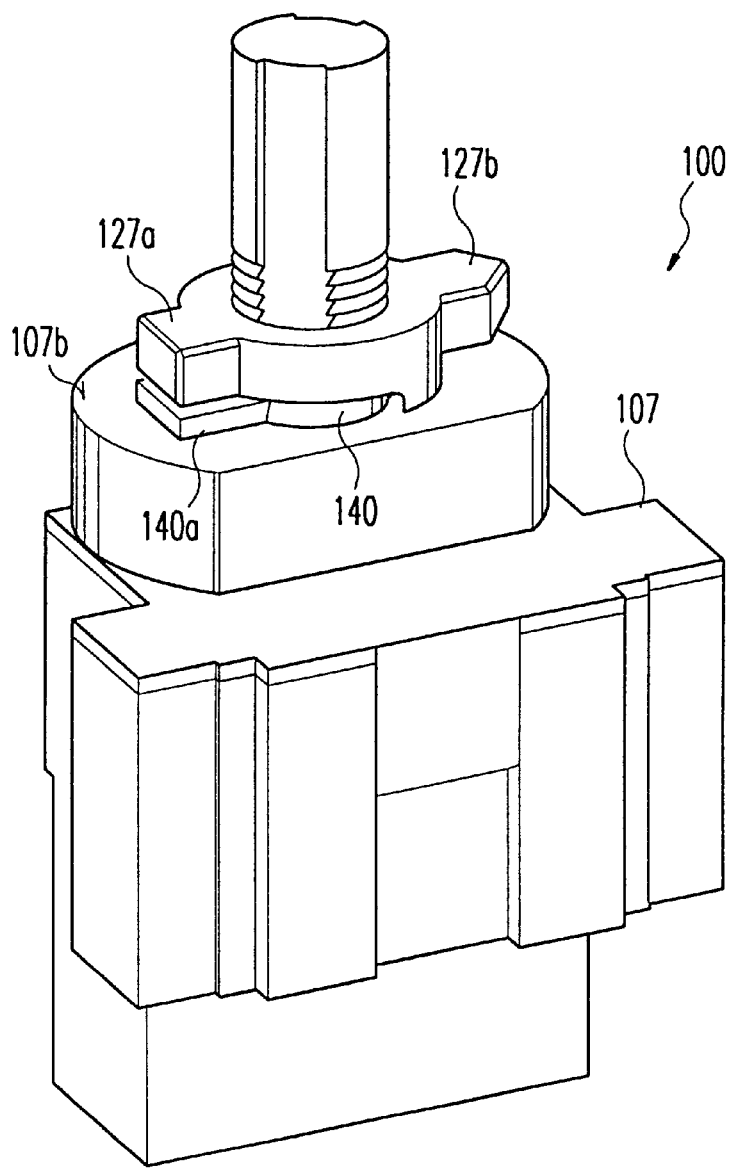
FIG. 1a is a perspective representation of an exemplary embodiment of a switch in accordance with the present invention.

Referring now to the drawings wherein the showings are for the purposes of illustrating the preferred embodiment of the invention only and not for purposes of limiting same, FIG. 1a shows a perspective view of the subject tappet switch 100 including a housing 107 defining a shoulder 107b serving as a stop lug or a stop surface for installing the housing 107 in an installation opening 103 (FIG. 1b) of an operatively associated assembly part 5.

The tappet switch 100 includes fastening members 127a, 127b which serve for arresting or fastening the switch in the assembly part 5. The installation opening 103 has, to that end, correspondingly formed encoding recess 103a, 103b, so that the switch can be pushed from below with the fastening members 127a, 127b through the installation opening until the shoulder 107b abuts the underside of the assembly part 5. In this position, the switch is lockable relative to the assembly part 5 by simply turning or rotating the switch housing.

Figure 1B:
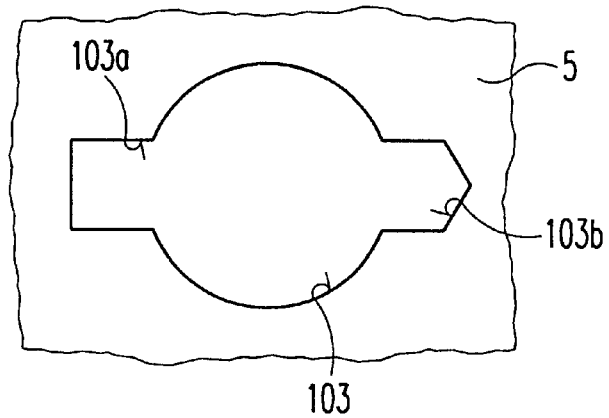
Figure 2:
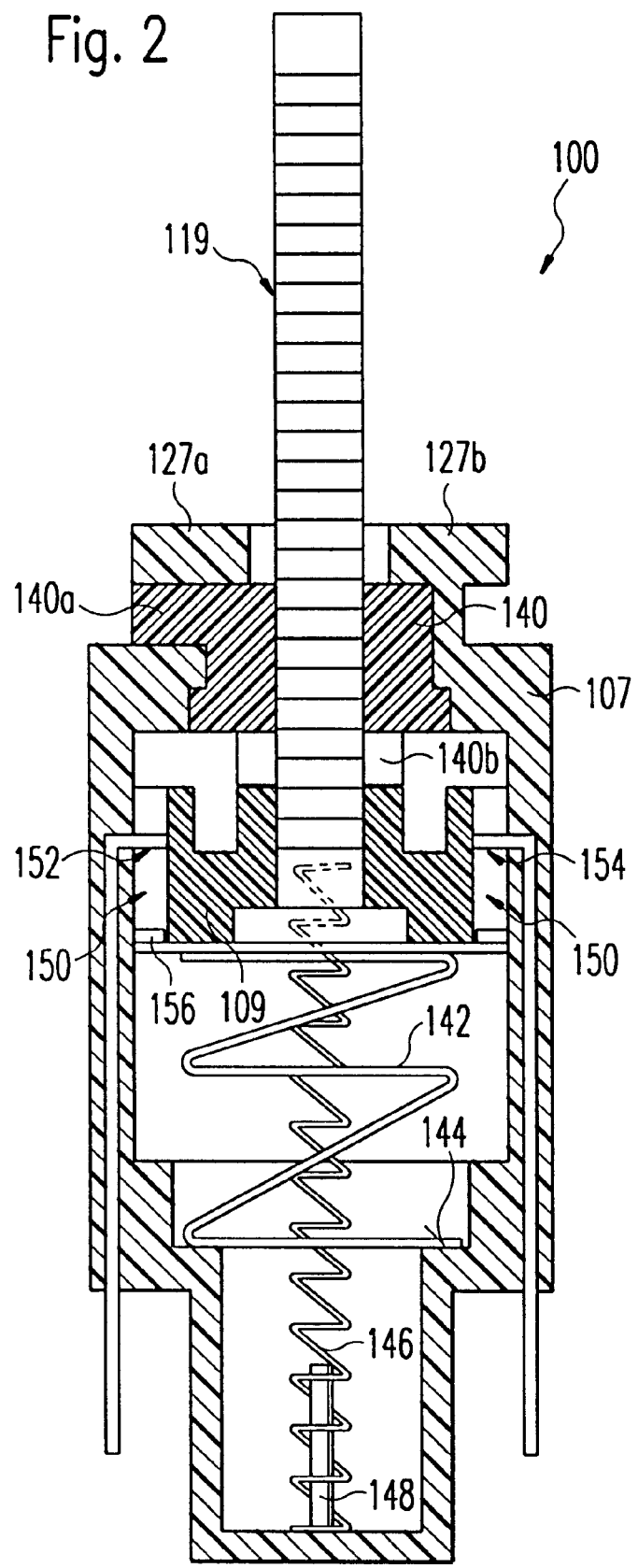
FIG. 2 is a longitudinal section through the switch shown in FIG. 1a in an adjustment and installation position of the tappet and slider member system; and, FIG. 3 is a longitudinal section through the switch shown in FIGS. 1 and 2 in a mounted or tappet and slider member locked position.

As shown in FIGS. 1b and 2, a rotatable separator piece 140 is provided in the upper region of the housing 107. The separator piece 140 is rotatable relative to the housing and includes a projection member 140a which, likewise, essentially corresponds to the shape of the encoding recess 103a as shown.

For inserting the switch 100 into the installation opening 103 of the assembly part 5b, the separator piece 140 is turned or rotated relative to the housing 107 in such a manner that the projection 140a is essentially in alignment with the fastening means 127a. The projection 140a engages the encoding recess 103 of the housing 107 with its shoulder 107b abutting the underside of the assembly part 5.

The tappet member 119 extends coaxially along the axis of rotation of the separator piece 140 opposite housing 107 in a slidable fashion via a corresponding recess in the separator piece 140. The cross section of the tappet member the recess in the separator piece 140 are chosen in such a manner that the tappet member 119 is held torsion-proof in the separator piece 140. That is, the tappet member 119 is not rotatable within the separator piece 140. Thus, the torsion-proof fastening (non-rotatable) of the separator piece 140 by means of the projection member 140a in the encoding recess 103a, the tappet member is also torsion-proof (non-rotatably) mounted to the assembly part 5. The tappet member, however, is slidable along its longitudinal axis within the separator piece 140. As a result, a twisting or rotating of the housing of the switch 100 relative to the assembly part 5 is also accompanied by a twisting and thereby realizing of a locking of the tappet and slider member system in a manner to be subsequently described.

Figure 3:
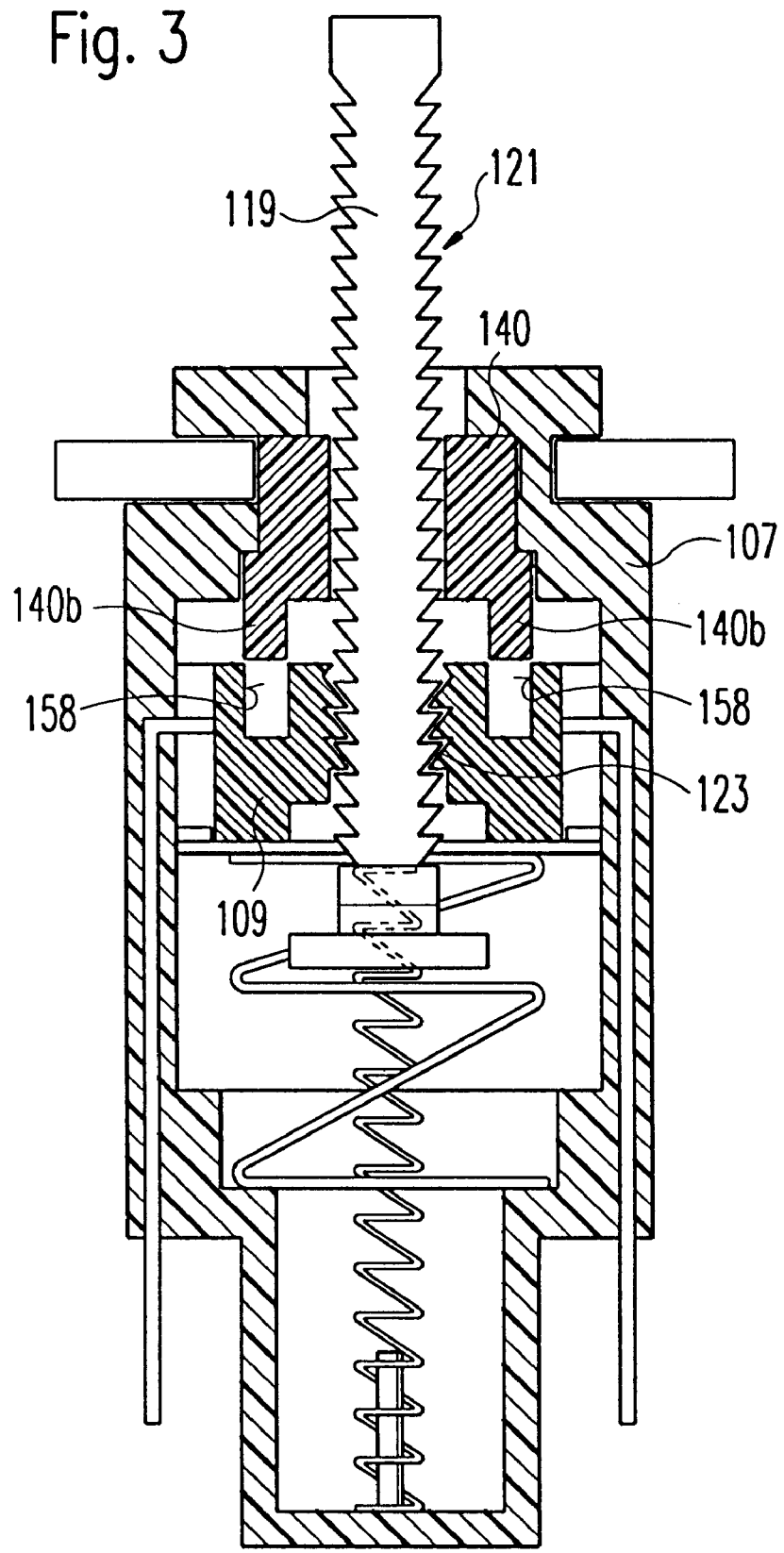

In order to permit locking, the tappet has, preferably on opposite longitudinal sides, locking means 121 which, as shown in FIG. 3, are preferably formed in a saw tooth-shaped notch arrangement. The locking means 121 cooperate with complimentary contact means 123, which are provided at the interior wall of the essentially annular-shaped slider member 109. In the unlocked state of the tappet and slider member system, a sliding displacement of the tappet member relative to the slider member is enabled in that the locking means 121 are rendered out of contact with the complimentary contact means 123.

For installing the tappet switch 100 in the installation opening 103, the tappet member 119 and the separator piece 140 are brought into an adjustment and installation position best shown in FIGS. 1a and 2. The adjustment and installation position permits the sliding displacement of the tappet member 119 relative to the slider member 109.

In this adjustment and installation position, the slider member is already advantageously disposed in the desired switching position best shown in FIGS. 2 and 3. The slider member switching position is defined by the two extensions 140b at the underside of the separator piece 140, whereby the slider member 109 is pressed with its upper side against the contact surfaces 140b via a biasing spring action force. To that end, a spring member 142 acts upon the underside of the slider member 109 and, on the other side, upon a shoulder region 144 in the lower area of the housing 107.

In addition, a second biasing spring member 146 is provided which includes an upper end accepted into a recess formed on the underside of the tappet 119 and which acts, with its other end, upon the bottom of the housing 107. The spring 146 is preferably held at the bottom of the housing by means of a suitable pin 148 or other connecting device.

The switching position of the slider member 109, best represented in FIG. 2, is selected in a manner that upon elimination of the striker effect of the extensions 140b in a manner to be subsequently described, an adequate switch path is produced for activation of the electric contact 150. In that regard, the electric contact 150 consists of at least two contact elements 152, 154 which are preferably connected to the underside of the slider member 109 by means of an electrically conducting element 156 formed on the slider member.

When inserting the switch 100 into the installation opening 103, the head of the tappet member is initially brought into contact with the respective side of an activation element such as a brake pedal or the like. After that, the switch is moved in the direction toward the activation element such as a brake pedal or the like, until the shoulder 107b rests against the underside of the installation part 5. During this process, the tappet member is displaced into the housing in a sliding fashion relative to the slider member 109, whereby the slider member is held via the spring member 142 in the switching position shown in FIG. 2.

Subsequent to the above steps, the housing 107 of the switch is next rotated in a manner described above by a specified predetermined angular increment, for example 90° thereby locking the tappet and slider member system. The locked position is best shown in FIG. 3. As is apparent from the above and as shown in the drawings, the rotating of the housing concurrently rotates the slider member 109 relative to the separator piece 140. In that way, the movement of the housing 107 concurrently achieves a modification in the relationship between the extensions 140b in a manner that the extensions lose their effectiveness as stop lugs against the slider member since they, as best shown in FIG. 3, thereafter face corresponding recesses 158 formed in the upper side of the slider member 109. In this-manner, with movement of the activation element such as a brake pedal or the like away from the installation part 5, a switching path of the slider member in the same direction (away from the installation part) is enabled. Upon displacement or movement of the slider member 109 or of the tappet and slider member system, the extensions 140b engage the recesses 158. After traversing a given displacement path, the contact elements 152, 154 are thereby electrically connected via the conductive element 158 formed on the slider member thereby establishing an electrical closed contact path.

The switch construction of the preferred embodiment prevents, in a very simple fashion, that any damage or destruction of the switch will occur upon a movement of the activation element in a direction opposite from the activation direction proper of the switch. To that end, the switch construction assures that the slider or the tappet and slider member system, starting in the switching position shown in FIGS. 2 and 3, has available an adequate displacement path in the respective activation direction (the downward direction in FIGS. 2 and 3). With this type of switch construction, it is not necessary to realize the trailing effect, stop lugs or the like implemented by means of a corresponding additional interlocking mechanism in the tappet member or the housing member. In addition, the preferred switch construction does not require any additional springs or biasing members or the like.

Turning now to FIG. 3, the saw tooth-shaped locking arrangement 121 is constructed in a manner that each tooth has an essentially horizontally extending upper and an obliquely extending lower area. The complimentary engagement means 123 of the slider member 109 are designed to intermate with the locking arrangement 121. The areas of each of the two engagement tooth arrangements 121 and/or of the contact means 123 cooperate during a first contact making engagement during the rotation of the slider member 109 with the housing 107 in order to lock the tappet and slider member system together. The engagement areas 121, 123 are preferably formed in a manner that no frontal surfaces abut each other at obtuse angles thereby blocking and/or locking rotational movement between the tappet and slider member. For that purpose, the leading or initial frontal surfaces or areas of the engagement portions 121, 123 may alternatively be formed to include an azimuthally extending pitch so that the lead areas of the frontal surfaces are reduced to form a first cutting edge on each tooth. The pitch extending in the azimuthal direction is constructed in such a manner that upon contact making of the initial areas of the locking teeth arrangements 121 and the contact means 123, with slightly staggered tooth systems, the tappet member with fixed slider is moved as far as is needed into the switch housing 107 until the tooth systems are in correct complimentary contact position. To that end, for example, the underside of each saw tooth of the contact means 123 may be formed to have in its initial area an azimuthally directed extending pitch extending from the superimposed oblique surface obliquely in the direction of the horizontally extending underside. Concurrently, the extremely small frontal surface or frontal cutting edge of each initial or lead area no longer extends in the radial direction but at such a pitch that with engagement of the initial areas of the tappet member and slider member tooth systems, the radially exterior areas first cooperate and only after certain overlapping of the tooth systems do the individual teeth interact fully in the sense of complete engagement.

As an alternative embodiment, instead of forming the azimuthal pitch on the undersides of the teeth of the slider member, the upper sides of the tappet member teeth can also be provided with corresponding complimentary slopes.

In contrast to the prior art known switches described above, the self-adjusting tappet switch according to the present invention greatly improves the installation and operating safety of the switch. In addition, although the preferred locking of the tappet and slider members take place by movement of the parts relative to each other, any other chosen manner of locking engagement may be used. As an example, the slider member may be displaceable in a plane extending vertically to the tappet member axis in order to bring corresponding engagement means to engagement, or in order to connect, after adjustment of the tappet member, with the slider member via insertion of a connection piece for example through a housing opening. Also, the locking of the tappet and slider member system and the simultaneous release of the switching path block can be accomplished by one or more separate actions. As an example, the locking can be accomplished by means of the described rotation of the tappet member relative to the slider member and the elimination of the stop lug effect can be effected through separate rotation or translatory movement of a stop lug element.

Instead of a stop lug for fastening the slider member in the specified switching position, the slider member can also be held in the desired position by one or more spring members and can, if needed, be deflected on either side from the thereby defined resting position in order to bring about the respective switching movement.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A self-adjusting tappet switch comprising:

a housing;

an electrical switch carried on the housing;

a slider member movable relative to the housing between a first slider member position spaced apart from said electrical switch and a second slider member position contacting said electrical switch, the slider member including a first engagement portion; and, an elongate tappet member including a second engagement portion selectively intermatable with the first engagement portion of the slider member to selectively lock the tappet member to the slider member, the tappet member being rotatable relative to the slider member between i) a first installation and adjustment position disengaging the first engagement portion from the second engagement portion to permit relative linear movement between the tappet member and both the slider member and the housing to enable adjustment of the tappet member relative to the slider member while the slider member remains in said first slider member position spaced apart from said electrical switch, and ii) a second locked position engaging the first engagement portion with the second engagement portion to prevent relative movement between the tappet member and the slider member, whereby in said second locked position, relative movement between the tappet member and the housing causes a corresponding movement of the slider member between said first slider member position spaced apart from the electrical switch and said second slider member position contacting said electrical switch.

2. The self-adjusting tappet switch according to claim 1 wherein tappet member is rotationally movable relative to said housing between said first installation and adjustment position and said second locked position.

3. The self-adjusting tappet switch according to claim 2 wherein the tappet member is longitudinally slidable relative to said slider member when the tappet member is in said first installation and adjustment position.

4. The self-adjusting tappet switch according to claim 1 further comprising a first resilient spring element biasing the slider member from said first slider member position towards said second slider member position.

5. The self-adjusting tappet switch according to claim 4 further comprising a second resilient spring element biasing said longitudinal slidable movement of the tappet member in a direction away from said housing.

6. The self-adjusting tappet switch according to claim 4 further comprising a separator piece movable within the housing between i) a first separator piece position preventing said slider member from moving from said first slider member position to said second slider member position, and ii) a second separator piece position permitting movement of the slider member by said first resilient spring element.

7. The self-adjusting tappet switch according to claim 6 wherein:
    said separator piece is rotated together with said rotational movement of the tappet member relative to said housing; and,
    said separator piece is adapted to slidingly receive the tappet member to permit said longitudinal slidable movement of the tappet member substantially without movement of the separator piece relative to the housing.

8. The self-adjusting tappet switch according to claim 6 wherein at least a one of the separator piece and the slider member include means forming a stop gap between the separator piece and the slider member preventing the slider member from moving between said first slider member position and said second slider member position when the tappet member is in said first installation and adjustment position and enabling movement of the slider member from between said first slider member position and said second slider member position when the tappet member is in said second locked position.

9. The self-adjusting tappet switch according to claim 8 wherein the tappet member, the slider member, and the separator piece are formed in cross section in a manner that a one of the tappet member and the slider member is slidably and non-rotatably held in an operatively associated installation part during insertion of the tappet switch into an operatively associated installation aperture while the respective other member is slidably and non-rotatably held within the housing.

10. The self-adjusting tappet switch according to claim 9 wherein the housing includes attachment members which are adapted to engage respective corresponding attachment members on an operatively associated installation part through rotation of the housing, whereby rotation of the tappet member and slider member simultaneously converts the self-adjusting tappet switch assembly from said installation and adjustment position to said locked position.

11. The self-adjusting tappet switch according to claim 1 further including means for holding said slider member a predetermined distance from said electrical switch when said elongate tappet member is in said first installation and adjustment position.

12. The self-adjusting tappet switch according to claim 11 wherein said means for holding the slider member said predetermined distance from said electrical switch includes:
    a separator piece movable within the housing between a first position preventing said slider member from moving from said first slider member position to said second slider member position, and a second position permitting movement of the slider member from said first slider member position to said second slider member position; and,
    a resilient spring element biasing the slider member from said first slider member position towards said second slider member position.

13. A self-adjusting tappet switch comprising:
    a housing;
    an electrical switch carried on the housing;
    a slider member selectively movable relative to the housing between positions spaced apart from said electrical switch and contacting said electrical switch;
    an elongate tappet member movable relative to the housing and selectively movable relative to the slider member;
    a first engagement portion associated with the slider member;
    a second engagement portion associated with the tappet member, the first and second engagement portions being interconnectable to selectively lock the slider member with the tappet member thereby establishing a relative adjustment position between the slider member on the tappet member; and,
    a separator member selectively holding the slider member fixed in an installation and adjustment position relative to said electrical switch when the first and second engagement positions are disengaged and selectively releasing the slider member from the installation and adjustment position when the first and second engagement portions are interconnected to permit the slider member to move with the tappet member relative to the electrical switch.

14. The self-adjusting tappet switch according to claim 13 wherein:
    at least one of the separator member and the slider member carry a projection member holding the slider member fixed in said installation and adjustment position spaced apart from said electrical switch, and the other of the separator member and the slider member include a recess adapted to selectively receive the projection member to permit relative movement between the separator member and the slider member.

15. The self-adjusting tappet switch according to claim 13 wherein:
    the first engagement portion includes a first set of teeth formed on the slider member;
    the second engagement portion includes a second set of teeth formed on the tappet member; and,
    the first and second engagement portions are selectively interconnectable by establishing relative rotational motion between the slider member and the tappet member.

16. An adjustable tappet switch comprising:
    a housing;
    an electric switch disposed in the housing;
    an elongate tappet member movable relative to the housing along a longitudinal axis of the tappet member;
    a slider member movable relative to the electric switch and selectively connectable with the tappet member, the slider member being held in a predetermined switching positions relative to said electric switch when disconnected from the tappet member to permit the tappet member to move relative to the slider member while the slider member is disposed in said predetermined switching position, the slider member being released from the predetermined switching position when connected with the tappet member to move relative to the electric switch and selectively activate the electric switch.

17. The adjustable tappet switch according to claim 16 further including a separator member for holding the slider member in said predetermined switching position relative to the electric switch when the slider member is disconnected from the tappet member and releasing the slider member to permit the slider member to move relative to the tappet member when the slider member is connected with the tappet member.

18. The adjustable tappet switch according to claim 17 wherein the separator member includes a stop lug for engaging the slider member to hold the slider member in said predetermined switching position when the slider member is in a first position relative to the separator member, the stop lug being received in a corresponding recess on the slider member to release the slider member from said predetermined switching position when the slider member is in a second position relative to the separator member.

19. The adjustable tappet switch according to claim 18 further including first and second engagement means on the slider member and the tappet member, respectively, the first and second engagement means selectively connecting the slider member with the tappet member when the slider is in a first position relative to the tappet member and disconnecting the slider member and tappet member when the slider member is in a second position relative to the tappet member.

* * * * *